United States Patent [19]

Abo et al.

[11] Patent Number: 5,083,480
[45] Date of Patent: Jan. 28, 1992

[54] SHIFT CONTROL SYSTEM FOR AUTOMOTIVE AUTOMATIC POWER TRANSMISSION WITH KICK-DOWN CONTROL ACCORDING TO PREDICTION OF DEMANDED ENGINE LOAD

[75] Inventors: Toshimi Abo; Hiroshi Takahashi, both of Kanagawa, Japan

[73] Assignee: Nissan Motor Coompany, Limited, Yokohama, Japan

[21] Appl. No.: 442,290

[22] Filed: Nov. 28, 1989

[30] Foreign Application Priority Data

Nov. 28, 1988 [JP] Japan .................... 63-298042

[51] Int. Cl.$^5$ .......................... B60K 41/08
[52] U.S. Cl. .................... 74/866; 364/424.1
[58] Field of Search .......... 74/866; 364/424.1

[56] References Cited

U.S. PATENT DOCUMENTS

| | | | |
|---|---|---|---|
| 4,039,061 | 8/1977 | Pruvot et al. | 364/424.1 |
| 4,194,608 | 3/1980 | Usui et al. | 192/0.092 |
| 4,361,060 | 11/1982 | Smyth | 74/866 |
| 4,380,048 | 4/1983 | Kishi et al. | 364/424.1 |
| 4,490,790 | 12/1984 | Shinoda | 364/424.1 |
| 4,630,508 | 12/1986 | Klatt | 74/866 |
| 4,635,508 | 1/1987 | Tatsumi | 364/424.1 |
| 4,653,007 | 3/1987 | Osanai et al. | 74/866 |
| 4,656,587 | 4/1987 | Osanai et al. | 74/866 |
| 4,658,360 | 4/1987 | Osanai et al. | 364/424.1 |
| 4,669,334 | 6/1987 | Miyaura et al. | 74/866 |
| 4,679,145 | 7/1987 | Beeck et al. | 364/424.1 |
| 4,680,992 | 7/1987 | Hayasaki et al. | 74/869 |
| 4,692,866 | 9/1987 | Kosuge | 364/424.1 |
| 4,698,764 | 10/1987 | Inagaki et al. | 364/424.1 |
| 4,735,114 | 4/1988 | Satoh et al. | 74/866 |
| 4,897,790 | 1/1990 | Bieber | 74/866 |
| 4,918,606 | 4/1990 | Ito et al. | 74/866 |

OTHER PUBLICATIONS

*Nissan Full-Range Electronically Controlled Automatic Transmission, RE4R01A Type Service Manual,* 1987.

*Primary Examiner*—Allan D. Herrmann
*Assistant Examiner*—Ryan W. Massey
*Attorney, Agent, or Firm*—Foley & Lardner

[57] ABSTRACT

A shift control system for an automotive automatic power transmission detects operational magnitude of accelerator and thus makes prediction of vehicular acceleration demand upon initiation of accelerator operation for entry of acceleration demand. The control system derives a transmission speed ratio on the basis of the predicted magnitude of acceleration demand.

10 Claims, 5 Drawing Sheets

SHIFT CONTROL SYSTEM FOR AUTOMOTIVE AUTOMATIC POWER TRANSMISSION WITH KICK-DOWN CONTROL ACCORDING TO PREDICTION OF DEMANDED ENGINE LOAD

BACKGROUND OF THE INVENTION

1. Field of the Invention

The present invention relates generally to a control system for an automotive automatic power transmission for an automotive vehicle. More specifically, the invention relates to a shift control for selecting speed ratio according to driving condition of the vehicle, in which is introduced a technology of predicting demanded engine load.

2. Description of the Background Art

In the automatic transmission, kick-down operation for selecting lower speed ratio for better vehicular acceleration performance is selected in response to acceleration demand. One example of shifting pattern in kick-down been illustrated in RE4R01A type Automatic Power Transmission Service Manual (A261C07) issued by Nissan Motor Co., Ltd. In the practical kickdown control, down-shifting timing is detected by detecting increasing of throttle valve open angle across a down-shifting criterion which is set according to the shifting pattern, with a certain lag time after initiation of increasing of depression magnitude of an accelerator pedal. With a further delay time due to lag time of hydraulic system governing the transmission speed ratio, down-shifting is actually performed.

In the worst case, the lag time in actually performing kick-down operation lags approximately 1 sec. from initiation of entry of the acceleration demand. Since kick-down operation is required in response to acceleration demand, such substantial delay in response will clearly degrade vehicle drive feeling. Also due to substantial delay in response, vehicular acceleration performance can be significantly lowered.

SUMMARY OF THE INVENTION

It is an object of the present invention to provide a transmission shift control system controlling kick-down timing in response to vehicular acceleration demand.

Another object of the invention is to provide a transmission shift control system which controls shift down timing utilizing prediction of vehicular acceleration demand for providing better response.

In order to accomplish aforementioned and other objects, a shift control system for an automotive automatic power transmission, according to the present invention, detects operational magnitude of accelerator and thus makes prediction of vehicular acceleration demand upon initiation of accelerator operation for entry of acceleration demand. The control system derives a transmission speed ratio on the basis of the predicted magnitude of acceleration demand.

According to one aspect of the invention, a shift control system for an automatic power transmission for an automotive vehicle, comprises:

a first sensor for monitoring behavior of an accelerator for producing a first sensor signal thereof, the first sensor signal being representative of an instantaneous engine load condition;

a second sensor means for monitoring a vehicle speed to produce a vehicle speed indicative second sensor signal;

a third means for detecting vehicular acceleration demand in excess of a predetermined acceleration demand criterion;

a fourth means, responsive to the third means detecting vehicular acceleration demand in excess of the predetermined acceleration demand criterion, for deriving variation of engine load during presence of acceleration demand, for sampling engine load variation data, and for deriving a predicted engine load variation on the basis of recently sampled predetermined number of the engine load variation data and;

a fifth means for deriving transmission speed ratio on the basis of the first and second sensor signals and the predicted engine load variation data.

In the preferred construction, the first sensor means monitors a throttle valve angular position for producing the sensor signal, and the fourth means derives the magnitude of the vehicular acceleration demand on the basis of variation of the throttle valve angular position. The fourth means may compare the acceleration demand magnitude with the acceleration demand criterion for detecting the acceleration demand magnitude increasing in excess of the acceleration demand criterion for latching the first sensor signal value as an initial engine load data and the acceleration demand magnitude decreasing across the acceleration demand criterion for latching the first sensor signal value as a final engine load data, and derive the engine load variation data on the basis of the initial engine load data and the final engine load data. The fourth means may store at least the predetermined number of most recently sampled engine load variation data and statistically derives the predicted engine load variation data based on the predetermined number of sampled engine load variation data.

The fourth means may take one of the engine load variation data which is most frequently occurring as the predicted engine load variation data. In the alternative, fourth means may take a running average of the predetermined number of stored engine load variation data as the predicted engine load variation data. In the further alternative, the fourth means may take a center value of distribution of the stored engine load variation data as the predicted engine load variation data. Furthermore, if the higher precision in control is required, it may also be possible that fourth means forms a plurality of groups of the predetermined number of stored engine load variation data and selectively utilizing one of the groups of engine load variation data for predicting the engine load variation.

The fourth means may derive the predicted engine load variation data as a throttle valve angular displacement magnitude representative data.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
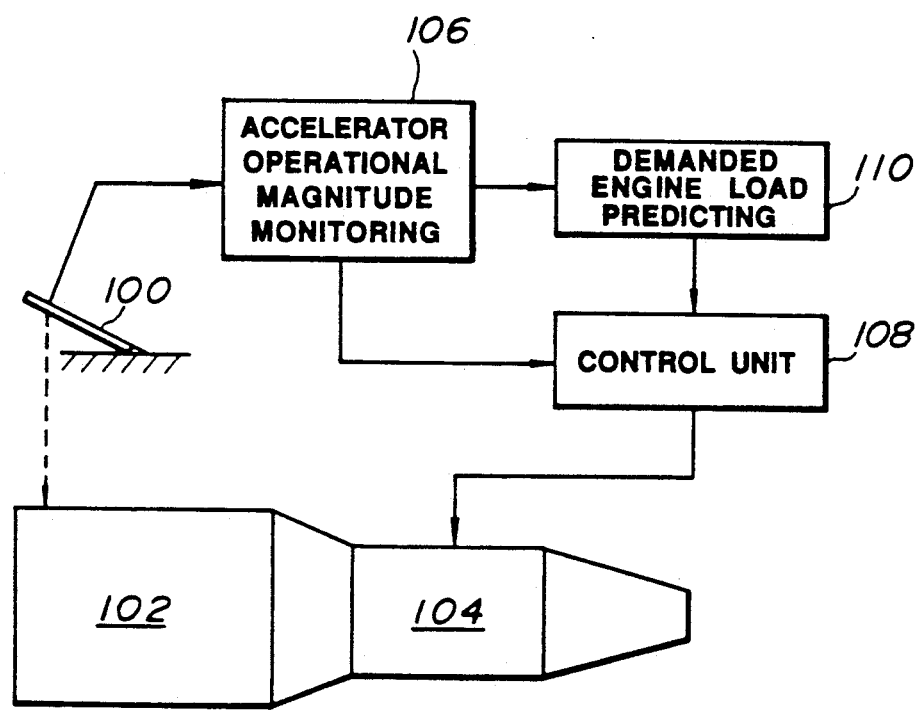
FIG. 1 is a schematic block diagram of the preferred embodiment of an automatic power transmission shift control system according to the present invention, which shows conceptual structure of the control system.

Referring now to the drawings, particularly to FIG. 1, the principal of a shift control system for an automotive automatic power transmission, in accordance with the present invention, will be discussed for facilitating better and concise understanding of the invention. As can be appreciated, the present invention is directed to an electric or an electronic, more preferably electronic shift control system which receives various transmission speed ratio control parameters in a form of sensor signals. For example, NISSAN Full-Range Electronically Controlled Automatic Transmission RE4R01A type Service Manual, published on March 1987, by Nissan Motor Co., Ltd. discloses such type of shift control system. A hydraulic system adapted for such electronic shift control system has been discussed in detail in U.S. Pat. No. 4,680,992, issued on July 21, 1987, to Koichi Hayasaki et al, and assigned to the common owner to the present invention. The disclosures in the above-identified prior publications are herein incorporated by reference for the sake of disclosure.

The electronic shift control system employs a demanded engine load represented by an operational magnitude of an accelerator 100, as one of transmission speed ratio selecting parameters. The accelerator 100 is associated with a throttle valve in an induction system of an automotive internal combustion engine 102 via known mechanical or electrical actuation mechanism (not shown) for adjusting a throttle valve opening angle as the demanded engine load. An automatic power transmission 104 is coupled with the engine 102 for adjusting revolution speed and driving torque to be distributed to vehicular driving wheels at a selected speed ratio.

According to the present invention, an accelerator operational magnitude monitoring means 106 is provided for monitoring magnitude of operation of the accelerator 100 to generate an accelerator operational magnitude representative parameter signal. A control unit 108 is designed for performing transmission shift control according to various transmission speed ratio selection parameters. In FIG. 1, only relevant functional blocks are illustrated which are associated for performing desired speed ratio selection including kick-down control.

A demanded engine load predicting stage 110 is provided and the control unit 108 includes a speed ratio deriving stage. Both of the demanded engine load predicting stage 110 and the speed ratio deriving stage receive the accelerator operational magnitude representative parameter signal. The demanded engine load predicting stage 110 is provided with a learning function for learning co-relation between accelerator operational behavior and final throttle valve opening angle for accumulating learnt data. The engine load predicting stage 110 statistically predicts throttle valve opening angle to be reached in terms of the instantaneous accelerator operational behavior on the basis of the accumulated learnt data and thus generates predicted throttle open angle data. The predicted throttle opening angle data is transferred to the speed ratio deriving stage.

Figure 6:
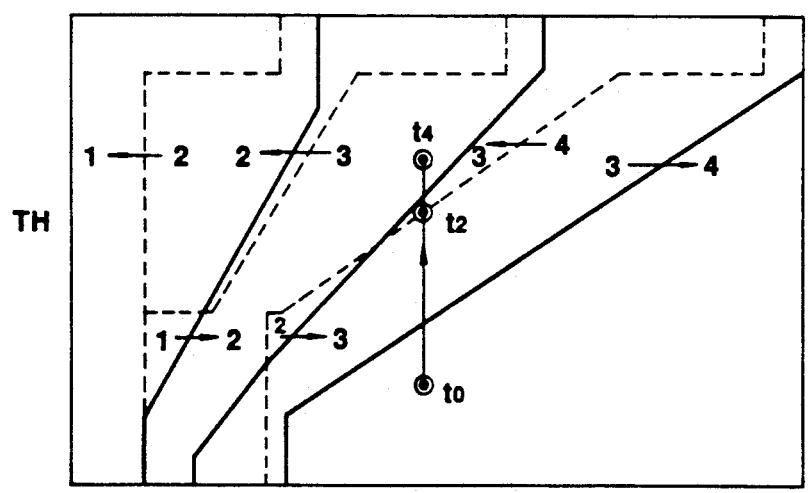
FIG. 6 is a chart showing transmission speed ratio selecting pattern in a typical automatic power transmission in relation to the throttle open angle and the vehicle speed.

The speed ratio deriving stage is provided with a preset shift pattern as shown in FIG. 6 for example. As can be seen, the speed ratio shifting pattern is generally set in terms of a vehicle speed V and a throttle valve open angle TH. The speed ratio deriving stage generally takes the accelerator operational magnitude representative parameter signal as one of speed ratio selection parameters. The speed ratio deriving stage is responsive to the predicted throttle opening angle data assuming kick-down criterion to select lower speed ratio irrespective of the actual accelerator position.

Therefore, with the shown invention, response characteristics of kick-down operation in relation to the vehicular acceleration demand entered through the accelerator can be significantly improved.

Figure 2:
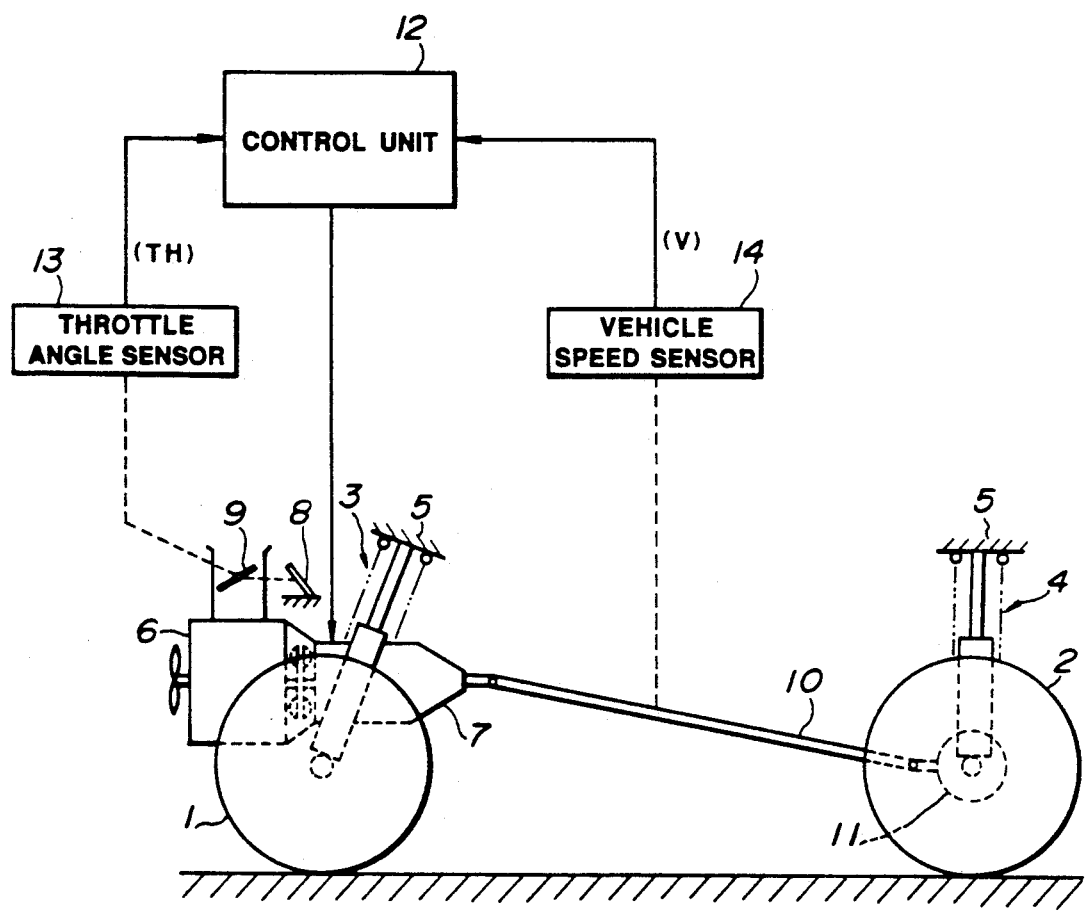
FIG. 2 is a schematic block diagram showing the preferred of the automatic power transmission shift control system in a practically implemented form

FIG. 2 shows the preferred embodiment of the transmission shift control system which may be applicable for practical implementation of the invention. As shown in FIG. 2, the shown embodiment of the shift control system is applied for front engine, rear wheel drive power train layout. However, the present invention is not specified for application to the shown power train layout but is applicable for any type of power train layouts.

In the shown construction, a front wheel 1 serves as steerable driven wheel and a rear wheel 2 serves as driving wheel to be driven by the driving torque transmitted through a power train. The front and rear wheels 1 and 2 suspend a vehicular body 5 through suspension mechanism 3 and 4. The power train includes an automatic power transmission 7, a propeller shaft 10 and a differential gear unit 11 transmitting the driving torque to the final drive. As set forth, the transmission 7 is coupled with an automotive internal combustion engine 6 as a prime mover of the vehicle. The engine 6 has an induction system including a throttle valve 9 which is coupled with an accelerator pedal 8 so as to cause angular displacement for adjusting the opening angle thereof and whereby adjusting the intake air flow path area in the induction system. The throttle valve 9 serves as a principal member for determining the engine load condition. A throttle angle sensor 13 is associated with the throttle valve 9 for monitoring the angular position of the latter to produce a throttle valve angular position indicative sensor signal TH. The throttle valve angular position indicative sensor signal TH is fed to a control unit 12 which generally comprises a microprocessor. Since the throttle valve angular position substantially or precisely corresponds to the operational magnitude of the accelerator pedal 8, the throttle valve angular position is taken as the accelerator operational magnitude representative parameter in the shown embodiment.

The control unit 12 is also connected to a vehicle speed sensor 14. The vehicle speed sensor 14, employed in the shown embodiment, is designed to monitor revolution speed of the propeller shaft 10 which normally represents an average rotational speed of the driving wheel 2. The vehicle speed sensor 14 thus output a vehicle speed indicative sensor signal V.

The control unit 12 processes the throttle valve angular position indicative sensor signal TH and the vehicle speed indicative sensor signal v for deriving a speed ratio of the transmission 7. The control unit 12 thus generates a shift command for operating various actuators in the hydraulic system of the transmission for switching working fluid flow path and whereby performs shift operation from one speed ratio to the selected one of the speed ratio.

In the shown embodiment, the control unit 12 performs kick-down control operation in response to the vehicular acceleration demand sensed on the basis of variation of the throttle valve angular position. The control unit 12 introduces a feature of prediction of a final throttle valve opening angle based on variation of the throttle angle position indicative sensor signal TH. Prediction of the final throttle valve angular position is performed by learning co-relation between the pattern of throttle valve angular position variation at the initial stage of accelerator operation and the final angular position of the throttle valve. The learnt data is accumulated so that statistic prediction in terms of the instantaneous throttle valve angular position variation pattern.

Figure 3:
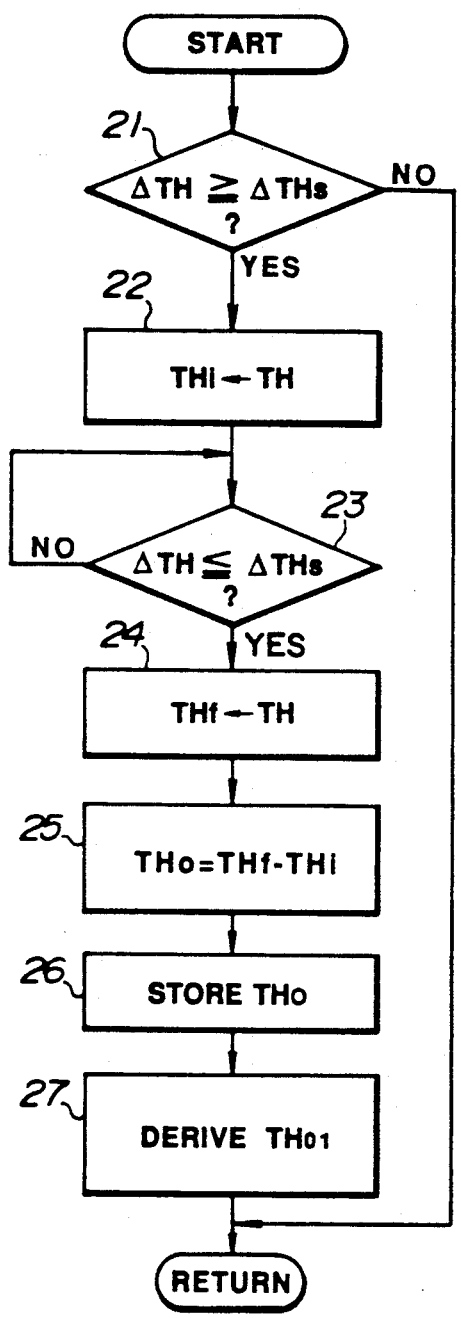
FIG. 3 is a flowchart showing a routine for predicting throttle open angle variation as a parameter representative of vehicular acceleration demand.

FIG. 3 shows the process of routine for learning and predicting the final throttle valve angular position. The shown routine is executed as timer-triggered interrupt routine to be executed at every fixed time intervals.

Immediately after starting execution as triggered, a magnitude of throttle valve angular displacement within the interval is derived as a throttle valve angular position variation data $\Delta TH$, at a step 21. At the step 21, the derived throttle valve angular position variation data $\Delta TH$ is compared with a predetermined criterion value $\Delta TH_s$ which represents a criterion across which discrimination is made whether the accelerator is operated or not operated. When the throttle valve angular position variation data $\Delta TH$ is smaller than the criterion value $\Delta TH_s$, which means that the position of the accelerator pedal 8 is held substantially constant and no noticeable acceleration or deceleration demand of the vehicle is entered. In such case, the process directly goes END and returns to a main program or background job for governing various routines.

Figure 7:
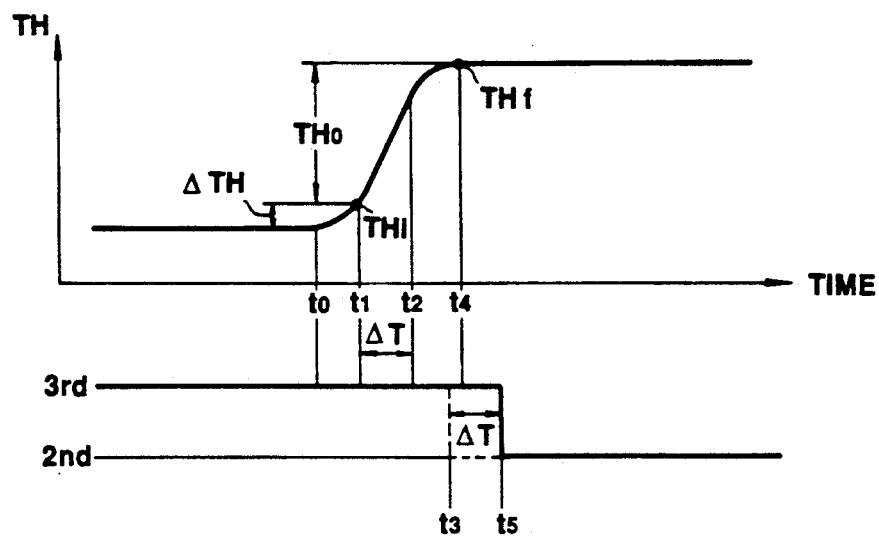
FIG. 7 is a timing chart showing down-shifting timing in kick-down operation in response to vehicular acceleration demand.
Figure 8:
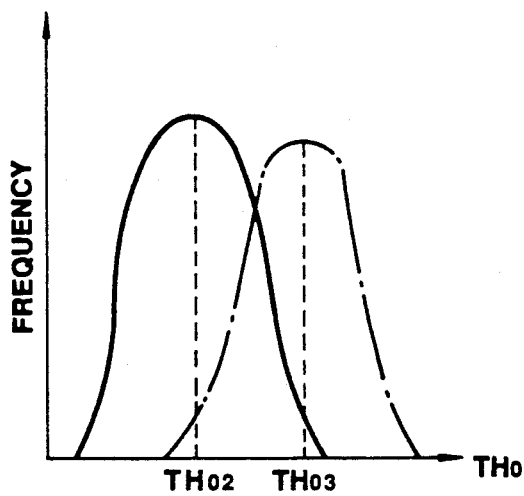
FIG. 8 is a similar chart to FIG. 5 and showing distribution of throttle open angle variation at every occurrence of accelerator operation.

On the other hand, when the throttle valve angular position variation data $\Delta TH$ is greater than or equal to the criterion value $\Delta TH_s$, judgement can be made that the depression magnitude of the accelerator pedal is varied for entry of the vehicular acceleration or deceleration demand. Then, the instantaneous throttle valve angular position indicative sensor signal value TH is latched and temporarily stored as an initial throttle valve angular position data $TH_i$ at a step 22. In practice, the initial throttle valve angular position data $TH_i$ corresponds to the instantaneous throttle angular position at a time $t_1$ upon occurrence of a certain magnitude of angular displacement ($\Delta TH$) from the initial position at the time $t_0$ at which variation of accelerator pedal depression magnitude is actually initiated, as shown in FIG. 7. Thereafter, a magnitude of throttle valve angular displacement from the initial angular position represented by the initial throttle valve angular position data $TH_i$ is derived as the throttle angle variation data $\Delta TH$. At a step 23, the throttle angle variation data $\Delta TH$ is compared with the criterion value $\Delta TH_s$. The process in the step 23 is repeated until the throttle angle variation data $\Delta TH$ becomes smaller than or equal to the criterion value $\Delta TH_s$. By repeating the process of the step 23, end of throttle valve angular displacement and thus termination of entry of the accelerator demand through the accelerator pedal 8 operation can be detected. When the throttle angle variation data $\Delta TH$ as checked at the step 23 becomes smaller than or equal to the criterion value $\Delta TH_s$, the instantaneous throttle valve angular position indicative sensor signal TH is latched as a final throttle valve angular position data $TH_f$ at a step 24.

At a step 25, a difference $TH_0$ between the initial throttle valve angular position data $\Delta TH_i$ and the final throttle valve angular position data $\Delta TH_f$ is derived and set as a throttle angular displacement magnitude indicative data. Then, at a step 26, the throttle valve angular displacement magnitude indicative data $TH_0$ is transferred and stored in an appropriate memory address of the control unit 12.

Figure 5:
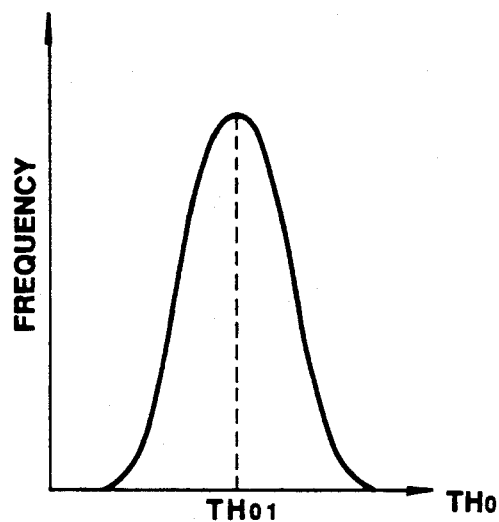
FIG. 5 is a chart showing distribution of throttle open angle variation at every occurrence of accelerator operation.

By the currently stored throttle angular displacement magnitude indicative data $TH_0$, a predicted throttle valve angular displacement magnitude indicative data $TH_{01}$ is updated at a step 27. In the shown embodiment, prediction is performed statistically utilizing the throttle valve angular displacement magnitude indicative data $TH_0$ sampled over a predetermined number of preceding execution cycles and sampled at the current execution cycle. For enabling this, the memory for storing the throttle angular displacement magnitude indicative data $TH_0$ may comprise a shift register for shifting stored data at every occasion of storing new data and erasing the oldest data. Such statistic prediction may be well appreciated from FIG. 5. As can be seen from FIG. 5, in prediction of the throttle angular displacement magnitude, the control unit 12 looks into the memory storing the predetermined number of the throttle valve angular displacement magnitude indicative data $TH_0$ to find one of the throttle valve angular displacement magnitude occurring at the highest frequency. Then, such the throttle valve angular displacement magnitude $TH_0$ occurring at the highest frequency is taken as the predicted throttle valve angular displacement magnitude indicative data $TH_{01}$.

It should be appreciated through the shown embodiment utilizing the throttle valve angular displacement magnitude at the highest frequency as the predicted throttle valve angular displacement magnitude data $TH_{01}$, it may also be possible to use the running average of the stored data or to use the center value of the stored data.

Figure 4:
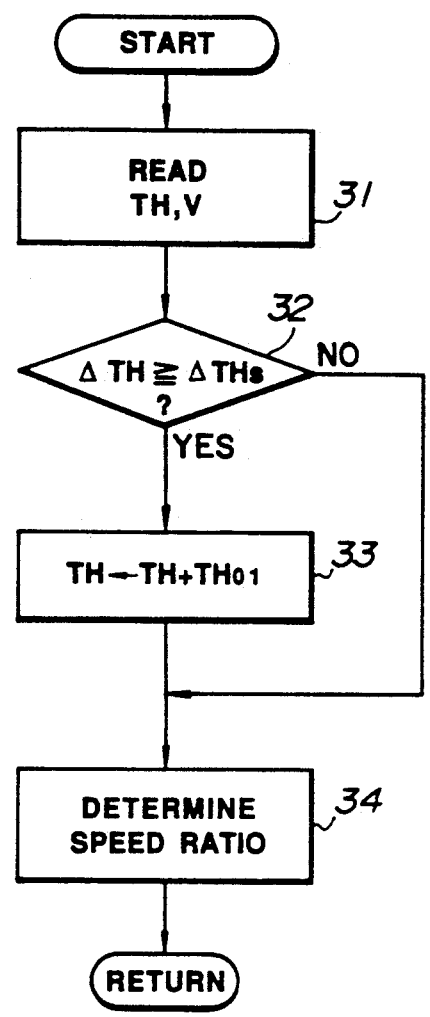
FIG. 4 is a flowchart showing a routine for selecting the transmission speed ratio.

FIG. 4 shows a process for deriving the speed ratio to be selected in view of the predicted throttle valve angular position in response to entry of acceleration demand through the throttle valve. The shown routine is executed with a regular time interval as the routine of FIG. 3.

Immediately after starting execution, the throttle valve angular position indicative data TH and the vehicle speed indicative sensor signal V are read out at a step 31. Then, the variation of throttle valve angular displacement within the interval is derived as a throttle valve angular position variation data $\Delta TH$. At step 32, the derived throttle angle variation data $\Delta TH$ is compared with a predetermined criterion value $\Delta TH_s$ for detecting whether the accelerator is operated or not operated, in the similar manner to that discussed with respect to the step 21 of the routine of FIG. 3. If the throttle valve angular position variation data $\Delta TH$ is greater than or equal to the criterion value $\Delta TH_s$ as checked at the step 32, then a predicted throttle valve angular position $TH_p$ to reach at the end of the angular displacement in response to the entry of the acceleration demand through the accelerator pedal 8 is derived at a step 33. Prediction of the throttle valve angular position to reach is performed by adding the predicted throttle valve angular displacement magnitude $TH_{01}$ derived through the routine of FIG. 3 to the instantaneous throttle valve angular position indicative data TH. Then, the predicted throttle valve angular position data $TH_p$ is set as the throttle valve angular position indicative data TH.

At a step 34, transmission speed ratio is selected in terms of the throttle valve angular position indicative data TH and the vehicle speed indicative data V. Derivation of the transmission speed ratio takes place according to the predetermined shift pattern as illustrated in FIG. 6.

On the other hand, when the throttle valve angular data $\Delta TH$ is smaller than the criterion $\Delta TH_s$ as checked at the step 32, the process directly goes to the step 34. Therefore, in such case, the predicted throttle valve angular displacement magnitude $TH_{01}$ is not taken into account. Therefore, the throttle valve angular position data TH as read at the step 31 is used it is.

In the practical operation, actual angular displacement of the throttle valve takes place as illustrated in FIG. 7. Namely, at the time $t_0$, entry of the acceleration demand through the accelerator pedal is initiated. According to this, the throttle valve opening angle increases gradually. Here, it is assumed at the time $t_0$, the transmission speed ratio is third speed ratio. At the third speed ratio, the 3-2 shifting down criterion is set as illustrated in FIG. 6. It is further assumed that the throttle valve opening angle in relation to the vehicle speed becomes greater than a 3-2 shifting down criterion as illustrated at a time $t_3$. In the normal shifting down operation, at the time $t_3$, a kick-down command is supplied to the automatic transmission for actuating associated valves for actually performing shift down operation. As set forth, since the hydraulic system of the automatic transmission will have a certain lag time $\Delta T$ from reception of the kick-down command to actual initiation of kick-down operation, actual speed ratio is shifted down to the second speed ratio at a time $t_5$.

In the improved process according to the present invention, the throttle valve opening angle in excess of the 3-2 shifting down criterion at the time $t_1$, at which the throttle valve angular variation $\Delta TH$ becomes greater than or equal to the criterion value $\Delta TH_s$, modified by utilizing the predicted throttle valve angular displacement magnitude $TH_{01}$. Therefore, at a time $t_1$ which is far ahead of the time $t_3$, the kick-down command is issued. Therefore, actual shift timing becomes much earlier than that in the normal kick-down operation. Therefore, response characteristics to the acceleration demand can be significantly improved.

Therefore, as will be appreciated herefrom, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the shown embodiment takes only one group of sampled throttle valve behavior data to be used for deriving predicted throttle angular displacement magnitude, it may be possible to set more than one groups of sampled throttle valve behavior data for selectively using one of a plurality groups depending upon accelerator operating behavior. For instant, it may be possible to monitor the elapsed time from initiation of entry of acceleration demand to the throttle angle variation becoming greater than the predetermined criterion value for selecting one of the groups depending upon the elapsed time. This will allow further precise kick-down control adapted to the actual vehicle driving condition.

What is claimed is:

1. A shift control system for an automatic power transmission for an automotive vehicle having an accelerator, comprising;
   a first sensor means for monitoring behavior of the accelerator and producing a first sensor signal which is representative of an instantaneous engine load condition;
   a second sensor means for monitoring a vehicle speed of the automotive vehicle and producing a second sensor signal which is indicative of the vehicle speed; and
   control unit means for repeatedly checking a speed of variation of said first sensor signal and determining a displacement from an initial engine load which said first sensor signal represents when said speed of variation exceeds a first criterion value and a final engine load which said first sensor signal represents when said speed of variation drops below a second criterion value, sampling said displacement determined as an engine load variation data, determining a predicted value out of a predetermined number of recently sampled engine load variation data, modifying said first sensor signal with said predicted value to give a result as an instantaneous engine load condition data during a presence of a predetermined acceleration demand and setting said first sensor signal as said instantaneous engine load condition data during an absence of said predetermined acceleration demand, and determining a speed ratio based on said second sensor signal and said instantaneous engine load condition data.

2. A shift control system as set forth in claim 1, wherein said first sensor means is a throttle angle sensor means for monitoring a throttle valve angular position.

3. A shift control system as set forth in claim 2, wherein said second criterion value is equal to said first criterion value, and aid control unit means compares said speed of variation of said first sensor signal with said first criterion value to determine whether or not said speed of variation is greater than said first criterion value and latches said first sensor signal as said initial engine load data upon said speed of variation exceeding said first criterion value and subsequently latches said first sensor signal as said final engine load data upon said speed of variation subsequently drops below said first criterion value, and derives said displacement by subtracting said initial engine load from said final engine load.

4. A shift control system as set forth in claim 3, wherein said control unit means stores said predetermined number of recently sampled engine load variation data and statistically derives said predicted value based on said predetermined number of sampled engine load variation data.

5. A shift control system as set forth in claim 4, wherein said control unit means takes one of the engine load variation data which is most frequently occurring as said predicted value.

6. A shift control system as set forth in claim 4, wherein said control unit means takes a running average of said predetermined number of stored engine load variation data as said predicted value.

7. A shift control system as set forth in claim 4, wherein said control unit means takes a center value of distribution of the stored engine load variation data as said predicted value.

8. A shift control system as set forth in claim 4, wherein said control unit means forms a plurality of groups of said predetermined number of store engine load variation data and selectively utilizing one of said groups of engine load variation data for determining said predicted value.

9. A shift control system as set forth in claim 4, wherein said control unit means derives said predicted value as a throttle valve angular displacement magnitude representative value.

10. A method of a shift control for an automatic power transmission for an automotive vehicle having an accelerator, said method comprising the steps of:

monitoring behavior of the accelerator and producing a first sensor signal representative of an instantaneous engine load condition;

monitoring a vehicle speed of the automotive vehicle and producing a second sensor signal indicative of the vehicle speed; and repeatedly checking a speed of variation of said first sensor signal and determining a displacement from an initial engine load which said first sensor signal represents when said speed of variation exceeds a first criterion value and a final engine load which said first sensor signal represents when said speed of variation drops below a second criterion value after said speed of variation has exceeded said first criterion value, sampling said displacement determined as an engine load variation data, determining a predicted value out of a predetermined number of recently sampled engine load variation data, modifying said first sensor signal with said predicted value to give a result as an instantaneous engine load condition data during a presence of a predetermined acceleration demand and setting said first sensor signal as said instantaneous engine load condition data during an absence of said predetermined acceleration demand, and determining a speed ratio based on said second signal and said instantaneous engine load condition data.

* * * * *